United States Patent
Krishnamurthy et al.

(10) Patent No.: US 8,321,303 B1
(45) Date of Patent: Nov. 27, 2012

(54) RETAIL PRODUCT OUT-OF-STOCK DETECTION AND DYNAMIC SCRIPTING

(75) Inventors: Venkat Krishnamurthy, Acton, MA (US); Jasjit Singh Mangat, Arlington, MA (US); Peter Billante, Needham, MA (US); Sachin Kumar Bansal, Bangalore (IN); Anupkumar Rao, Pune (IN)

(73) Assignee: Checkpoint Systems, Inc., Thorofare, NJ (US)

( * ) Notice: Subject to any disclaimer, the term of this patent is extended or adjusted under 35 U.S.C. 154(b) by 1639 days.

(21) Appl. No.: 11/695,511

(22) Filed: Apr. 2, 2007

(51) Int. Cl.
*G06Q 40/00* (2006.01)
(52) U.S. Cl. ......................................... 705/28
(58) Field of Classification Search ................ 705/28
See application file for complete search history.

(56) References Cited

U.S. PATENT DOCUMENTS

| | | | |
|---|---|---|---|
| 5,963,134 A | 10/1999 | Bowers et al. | |
| 6,341,269 B1 | 1/2002 | Dulaney | |
| 6,439,345 B1 | 8/2002 | Recktenwald | |
| 6,520,544 B1 | 2/2003 | Mitchell | |
| 6,826,554 B2 | 11/2004 | Sone | |
| 6,829,520 B1 | 12/2004 | Green | |
| 6,837,427 B2 | 1/2005 | Overhultz | |
| 6,837,436 B2 | 1/2005 | Swartz | |
| 6,901,304 B2 | 5/2005 | Swan | |
| 6,951,305 B2 | 10/2005 | Overhultz | |
| 6,982,640 B2 | 1/2006 | Lindsay | |
| 7,005,988 B2 | 2/2006 | Mathewson, II | |
| 7,012,528 B2 | 3/2006 | Mathewson, II | |
| 7,021,535 B2 | 4/2006 | Overhultz | |
| 7,050,991 B2 | 5/2006 | Ogasawara | |
| 7,097,098 B2 | 8/2006 | Roberts | |
| 7,111,775 B1 | 9/2006 | Tennison | |
| 7,113,094 B2 | 9/2006 | Garber | |
| 7,114,656 B1 | 10/2006 | Garver | |
| 7,121,457 B2 | 10/2006 | Michal, III | |
| 7,123,151 B2 | 10/2006 | Garber | |
| 7,129,837 B2 | 10/2006 | Shannon | |
| 7,133,843 B2 | 11/2006 | Hansmann | |
| 7,136,826 B2 | 11/2006 | Alsafadi | |
| 7,136,832 B2 | 11/2006 | Li | |
| 7,142,110 B2 | 11/2006 | Schmidtberg | |
| 7,142,124 B2 | 11/2006 | Chi | |
| 2005/0043857 A1* | 2/2005 | Van Fleet | 700/286 |

FOREIGN PATENT DOCUMENTS

WO    WO9530201    11/1995

* cited by examiner

*Primary Examiner* — Shay S Glass
(74) *Attorney, Agent, or Firm* — Ceasar, Rivise, Bernstein, Cohen & Pokotilow, Ltd.

(57) ABSTRACT

The invention includes a method of detecting out-of-stock conditions for retail products, and for dynamically updating associated replenishment plans, sales forecasts, and event scripts for product stocking events such as turn stock products, promotional products, new product introductions and modular resets. The invention accesses RFID data associated with product stocking events for identifying product movements in a retail supply chain and within a retail store. The invention optionally accesses point-of-sale and perpetual inventory data for detecting out-of-stock conditions. The invention also includes a method for dynamically improving product layout and optimized planograms based on out-of-stock velocity detection.

23 Claims, 6 Drawing Sheets

RETAIL PRODUCT OUT-OF-STOCK DETECTION AND DYNAMIC SCRIPTING

CROSS-REFERENCE TO RELATED APPLICATIONS

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2007 OATSystems, Inc.

BACKGROUND OF THE INVENTION

1. Field of the Invention

The present invention relates to managing supply chain, inventory, and out-of-stock conditions for retail products. The present invention also relates to radio frequency identification systems and methods for tracking retail products.

2. Background

Maintaining a properly-stocked retail store is challenging to retailers, manufacturers, and others within a supply chain. A properly-stocked retail store optimizes sales for retailers and manufactures, and meets expectations of consumers. There are several challenges to maintain product properly stocked on regular shelf locations. High turn over products need to be monitored constantly because such products can quickly sell-through or sell-out. Low and moderate turn over items may not be monitored sufficiently to detect out-of-stock conditions. Stocking compliance by retailers is a challenge. It is difficult to identify products which are misplaced or lost in a backroom of a retail store. If a manufacturer presumed such misplaced products to be on a shelf, then such an erroneous presumption may result in lower sales and cause a manufacturer to decrease sales forecasts and the amount of product shipped to a store. This can create a negative feedback supply cycle that can damage or ruin a product line. Other challenges arise from new product introductions and modified or reorganized shelf locations.

Product stocking events for promotional items and displays have additional challenges. Manufacturers and suppliers of consumer packaged goods (CPG) use promotional events to increase sales of goods at retail stores. Visibility is a key to such trade promotions. Displaying goods as end caps of aisles, in action alleys, or in other high-traffic areas dramatically increases sales of goods. A display-based promotion of goods can increase sales by 500% or more. Valuable display areas within a retail store are often leased to CPG manufacturers.

Spending on promotions of goods is substantial. CPG manufacturers spend over $75 billion per year on trade promotions, yet less than 30% of their programs are profitable. In spite of a need to improve management of trade promotions, the vast majority of CPG companies still does not capture or measure promotion results.

It is common for manufacturers to create and ship entire displays to be positioned in action alleys and other high-visibility or high-traffic areas. Retailers have the responsibility to receive and position these displays on sales floors in correct locations and at correct times.

One challenge associated with such promotional displays of goods, is compliance by retailers. Manufacturers create displays and designate where and when a display is to be placed, i.e. moved to the sales floor, but manufacturers rely on retailers to properly execute and monitor for when a promotional display goes out-of-stock. With retailers selling and managing hundreds and thousands of different items, it is difficult to ensure that promotional displays are moved to the sales floor at designated times. With some promotional events, it is typical for over half of participating retail stores to be late moving promotional displays to sales floor.

In addition to late execution of displays, incorrect placement of displays can reduce sales. In large retail stores, a given manufacturer may have multiple promotional displays scheduled to be moved to specific zones or areas on a sales floor. The specific physical display location may be predetermined based on the type of goods or by agreement with a retailer. For example, a manufacturer may pay more for using display space in a higher-traffic area, but during execution a sales associate may move this manufacturer's display to a lower-traffic area. With incorrectly placed displays, a manufacturer is overpaying for space and losing sales.

Early display execution is also a problem for suppliers and retailers. Some retailers may move a received display to the sales floor from a few days to a couple of weeks before the scheduled launch date causing display products to sell-out or sell-through before the intended launch date.

Poor promotional display execution damages the reputation of retailers and manufacturers. Promotional displays are often tied to television, radio, Internet, print, or other advertising campaigns. Manufacturers do not meet a shoppers expectations with late or incorrectly placed displays, or displays that are out-of-stock. It is important to have promotional goods placed when and where a shopper expects.

During pre-promotion, tracking of store-level promotion execution is limited and difficult. Manufacturers can track execution by visiting retail stores, or repeatedly communicating with managers of individual stores, but such activities become time consuming and expensive. It is also difficult to determine which stores have not received promotional displays before the start of a corresponding promotional event.

During promotions, manufacturers are limited to tracking aggregate point-of-sale data. There is substantial latency in receiving point-of-sale data. If this sales data is within a specified range, the manufacturer has no specific basis for being alarmed. After a promotional event, there is no execution data to support increases in sales forecasts for future promotions and to defend poor sell-through of promotional products. There is also no systematic learning of promotional event performance.

Description of Prior Art

United States Patent Application Publication 2005/0149414 (Jul. 7, 2005, Schrodt) titled "RFID System And Method For Managing Out-Of-Stock Items," discloses a system for providing product information in a supply chain to a consumer. Schrodt makes use of RFID tags on each distinct product, RFID readers located within or near display shelves, and a customer interface. When a distinct product is out-of-stock, the consumer is provided with information about whether the distinct product is in the backroom. The consumer can also be provided incentives to wait for the distinct product or to return later when the product is in stock.

U.S. Pat. No. 7,021,535 (Apr. 4, 2006, Overhultz) titled "Advertising Compliance Monitoring System" discloses a method for remotely monitoring compliance of an advertising system by determining presence of signs at predetermined locations using RFID tags. Overhultz provides a system to ensure that advertising programs that display one or more advertising signs or marketing materials, such as freestanding advertisements at gas stations, are in fact being posted.

International Patent Application Publication WO11995/030201 (Nov. 9, 1995, Scroggie) titled "Method And Apparatus For Real-Time Tracking Of Retail Sales Of Selected Products," discloses a method for generating sales reports of selected items. Scroggie focuses on processing sales data quickly for performance analysis and inventory control. Scroggie maintains a database of retail sales transactions captured from retail store computer data. Data for sales transactions are transmitted to a data processing site for generating sales reports on selected items.

U.S. Pat. No. 7,136,832 (Nov. 14, 2006, Li) titled "Supply Chain Visibility For Real-Time Tracking Of Goods" discloses a method for real-time tracking of goods in a supply chain using radio frequency identifiers. The method teaches compensating for missed reads using current read data and data from a previous read. Collected supply chain data is then sold to supply chain users based on the number of goods tracked.

None of the above provides a method of detecting incorrect placement of promotional displays, promotional event out-of-stock conditions, and a method of dynamic scripting to automatically and frequently adjust sales forecast data and replenishment plans. None of the above provides a method of detecting out-of-stock conditions for retail products and promotions based on RFID data, and dynamically updating product supply plans, updating sales forecasts or alerting of such conditions. None of the above provides a method of dynamically optimizing planograms and product displays based on RFID, point-of-sale, and perpetual inventory data.

BRIEF SUMMARY OF THE INVENTION

The present invention includes a process for detecting out-of-stock conditions for product stocking events and dynamically refining sales forecasts and associated replenishment plans for turn stock products, promotional products, new product introductions and modular resets, using a combination of real time radio frequency identification (RFID) data, current and historical point-of-sale data, and perpetual inventory numbers from a retail supply chain. The invention enables refined forecasts, and replenishment plans to improve sales and timing of promotions execution.

Out-of-stock conditions include sell-through and sell-out situations of turn stock shelf products, non compliance of product stocking with placement of product displays at correct times, sell-through and sell-out situations from early placement of product displays, non compliance situations of a store having promotional event displays in the backroom after the start of an event, situations of stores having not received promotion event displays, stores which have apparently trashed a display early, or similar situations.

The invention accesses and analyzes RFID data read from products within a supply chain and/or retail store. RFID data may be accessed from an RF ID data collection system. RFID data includes unique and generic identifiers for RFID-tagged products. RFID-tagged products refers to both individually-tagged products and containers, packaging, or displays that are tagged. For example, RFID transponders can be affixed to individual products, to cases or boxes of products, shipping containers, pallets, display cases or displays such as temporary cardboard promotional displays.

RFID systems for reading RFID-tagged products may used RF ID readers at various locations throughout a supply chain and retail store. For example, readers may be located at entry and exit doors of manufacturing locations and distribution centers. Within a retail store, readers may be located at a loading dock, at impact doors or gateways between a backroom and a sales floor, and at a box crusher or trash area. Mobile RFID readers may be used that automatically or manually move through a backroom or sales floor to read RFID-tagged products and record location of reads. The invention processes such RFID data to determine a location of products and displays. This includes identifying where on a sales floor a particular product is physically stocked, e.g. aisle No. 2 end cap or action alley near checkout No. 7. For incomplete or missing RFID data, the invention infers product movement data based on previous and subsequent reads, and/or historical data.

The Invention also accepts RFID data from tagged employees, brokers, contract sales representatives, or other supply chain personnel. Some RFID data collection systems alternatively read employee badges or other employee tagging method. The invention can analyze RFID data from both tagged products and tagged employees to identify out-of-stock conditions.

In one embodiment, the invention includes a computerized method of detecting out-of-stock conditions for retail products. The invention accesses product movement RFID data associated with a product stocking event. RFID data can be accessed or received continuously in real time, or in any possible frequency such as seconds, minutes, hours, or days. RFID data can be automatically or manually accessed. Such RF ID data includes data read from RFID transponders affixed to or associated with retail products in a supply chain and in a retail store. Transponders can be used with items, cases, pallets, or displays. RFID data includes product identification information such as electronic product codes. RF ID data may include mapping GTIN or EPC numbers to the UPC numbers. The data also includes information identifying date, location, and time of read.

The RFID data accessed by the invention is sufficient for the invention to identify whether RFID-tagged retail products are located on a retail store sales floor or in a retail store backroom. The product stocking events associated with RFID data are any type of stocking event such as regular shelf stocking, promotional events, and new products. The invention then identifies out-of-stock conditions for the product stocking event based on the accessed RFID data. Once out-of stock conditions are identified, the invention can perform any number of functions such as update a product stocking event plan, send alerts to users, sales associates or retail store employees, update supplier's event scripts, and update sales forecasts. Sales forecasts include predictions of what a retailer or supplier will sell by store and by date. The invention can additionally access point-of-sale data and/or perpetual inventory data associated with the product stocking event, and use this data, with the RFID data to identify out-of-stock conditions. For missing or incomplete RFID reads, the invention infers RFID data based on previous and subsequent reads. The RFID data accessed by the invention can also include employee movement data from RFID-tagged employees or individuals. By comparing employee-tagged RF ID data and product RFID data, the invention better identifies product stocking compliance and out-of-stock conditions.

In another embodiment, the invention accesses historical RFID data associated with a completed product stocking event. Historical RFID data includes information about completed movements of RFID-tagged retail products within a retail supply chain and within a retail store. Historical RFID data is used to create event scripts for a product stocking event. These event scripts can also be based on historical point-of-sale or perpetual inventory data. The invention then uses a combination of RFID, point-of-sale, and perpetual inventory data to identify out-of-stock conditions and update these event scripts.

In another embodiment, the invention uses current and/or historical RFID data to predict out-of-stock conditions based on timing, movement, and location of RFID-tagged retail products across a set of RFID-enabled retail stores. The invention identifies stores with out-of-stock conditions to provide an opportunity for correction, and for dynamically updating sales forecasts and event scripts. The invention also identifies stores that will most likely not comply with a given prod stocking event by a scheduled start or end date.

In another embodiment, the invention includes a method of out-of-stock velocity detection and comparative dynamic scripting for retail products. The invention monitors RFID data for multiple product stocking events. The invention also monitors point-of-sale data for product stocking events including turn stock products. Sales of products among multiple product stocking events are analyzed and compared. Based on comparisons and identified velocity of sales from monitored events, the invention optimizes a sales floor product location plan, a pianogram, or event scripting including instructions about diverting products from low-performing stores to high-performing stores. RFID and point-of-sale data can be combined with perpetual inventory data.

Features and Advantages

The invention provides a single view of all product stocking events and promotions, and target locations for manufacturers and store managers. The invention identifies products or displays that are not in the correct location or missing from the sales floor. The invention reduces store error rate and labor effort to execute and maintain product stocking events and trade promotions.

The invention provides substantially higher compliance of movement of products to the sales floor. The present invention also enables higher sell-through rates of goods and higher uplift. The invention makes it easier for store associates to execute displays and provides a system for measuring performance.

Another advantage of the present invention is providing an opportunity for corrective action. During a product stocking event, the invention identifies stores with products that have not moved to a sales floor. This alerts store coverage personnel and enables store personnel to act.

The invention identifies early sell-through activity by store and dynamically updates replenishment scripts so that a manufacturer can replenish stores by sending additional products or promotional items or displays to identified stores.

After a product stocking event, the invention provides store-level execution data to support increases in sales forecasts, defend lower sell-through and lift numbers, and improve quality management initiatives.

One feature of the invention is that the invention is operable to track tagged displays, cases, and/or individual retail products. The advantage of tracking displays is that tagging is easier, and read rates and tag survival rates are higher than those of individually-tagged retail products.

The invention enables tracking arrival of promotional materials at each warehouse and retail store. The invention sends alerts for retail stores that move a display to the sales floor early. The invention provides alerts for stores that have yet to receive a promotional product.

Throughout trade promotions and product stocking events, the invention provides various reports for monitoring performance and execution of trade promotions, and for analysis of trade promotions.

Many promotional events are for items that are also sold on shelves during a promotional period and also during non-promotional periods. The invention selectably shows only net promotional sales or promotional item sell-through in any given report, thereby enabling an understanding of sales impact of the promotional event.

Another advantage is that the invention provides an opportunity to better use "set allocations" for distribution centers. The script/allocation for a given distribution center (DC) is typically agreed upon a few months in advance. DCs ship to retail stores usually in one wave, without checking actual on-hands inventory in store. For example, a DC ships an initial wave of products to all stores to cover a minimum display quantity. Based on actual store execution and sales performance, the invention allocates remaining inventory to high-performing stores. This minimizes a situation of poor performing (or wrong forecast) stores being left with excess inventory that they can not sell and enables retailers to sell the right product at the right place.

Other advantages of the invention for retailers include increased product contribution margin dollars from increased sales, optimized sales per square foot dedicated to promotional displays, optimized co-op value by store or location, recaptured loyalty due to improvement in product availability, and increased competitiveness due to improvement in product availability. On-time execution results in less backroom inventory, thereby resulting in reduction in labor working the products in the backroom. The inventions enables addressing problems of phantom inventory, missed execution, and low inventory. Store associates are provided a very clear, graphical screen view that displays a promotion planogram compared to actual execution to quickly identify actions that are required.

Other advantages of the invention for manufacturers include increased product contribution margin dollars from increased sales, increased display effectiveness, reduced cycle time to evaluate display effectiveness and improve displays, reduced cost to send representatives to physically visit stores, and lower cost-per-impression of in-store advertising.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION OF THE INVENTION, INCLUDING THE PREFERRED EMBODIMENT

Terminology

Figure 1:
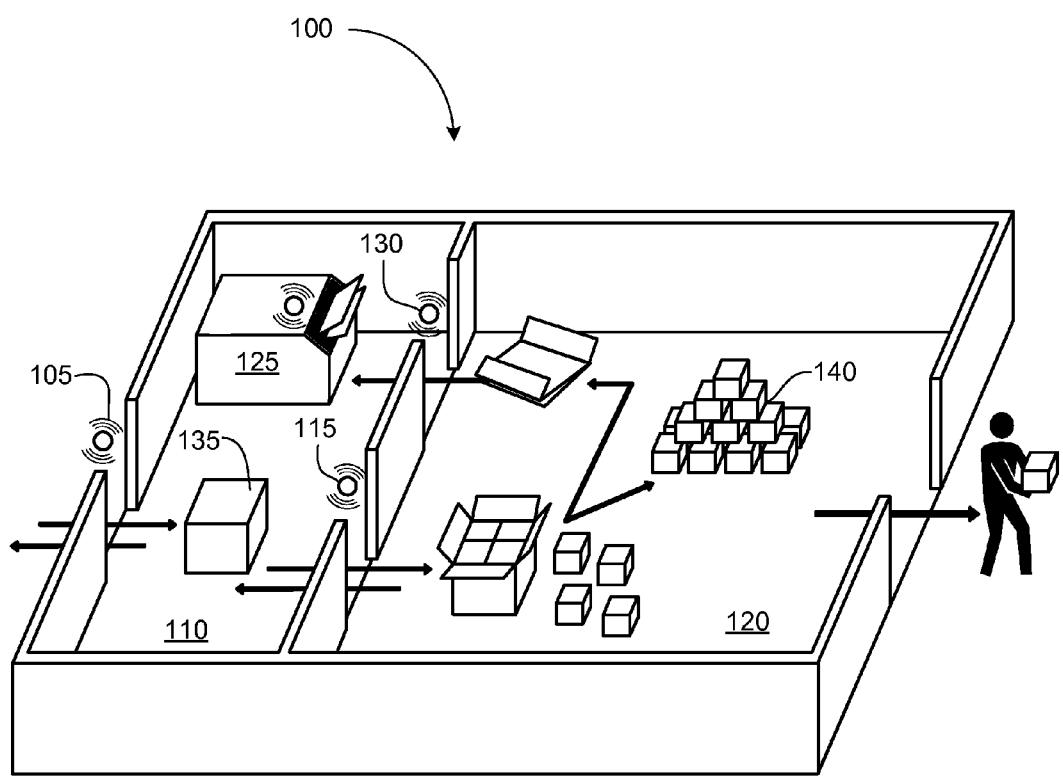
FIG. 1 is diagram of an RFID-enabled retail store

The terminology and definitions of the prior art are not necessarily consistent with the terminology and definitions of the current invention. Where there is a conflict, the following definitions apply.

Action Alley—the main aisle in a retail store where typically the highest velocity promotional items appear in palletsized displays or as PDQs. It is the best placement for any product as it receives the most traffic from consumers.

CPG (Consumer Packaged Goods)—products manufactured for retail sale that usually have a high turn over. Products include razors, soup, paper towels, socks, etc.

Event Script or Script—name of instructions sent from a product manufacturer or supplier to a retailer, or a set of instructions associated with product stocking events used by a supplier only. Scripts are often sent via third-party. Scripts indicate how many of each SKU is scheduled to go to each store number. Retailers attempt to follow these instructions, but may be forced to deviate for various reasons (i.e. flooded store, etc). A script is also an allocation of products to specific stores.

Global Trade Item Number (GTIN)—a unique number used to identify items and products worldwide.

Lift—Lift or uplift refers to an amount of increase in sales volume, and especially beyond what would have been sold in absence of a promotional event.

Modulars—refers to retail shelfs and shelf systems. Modular resets are changes to the layout of such shelves. Such changes include a change to facings that a customer sees, e.g. arrangement of columns of soup or of detergents, etc. Modular resets are disruptive and usually happen only once or twice a year. Shelves, or modulars, in general are more regimented than end-caps, promotions etc.

Out-Of-Stock Conditions—includes sell-through or sell-out situations with placement of product displays at correct times, sell-through or sell-out situations from early placement of product displays, noncompliance situations of a store having promotion event displays in the backroom after the start of an event, situations of stores having not received promotion event displays, or stores which have apparently trashed a display early for various reasons.

PDQ (Pretty-Darn-Quick)—an industry term for a type of retail display that is shipped pre-built so that display setup time in the store is pretty darn quick.

Perpetual Inventory—A book inventory identifying stock on hand by means of a detailed record, enabling a retailer firm to know the composition of its inventory at any point in time.

Planogram—a computerized diagram used in merchandising to design the ideal display of retail merchandise on retail store shelves. Planograms can be used to design turn stock locations, end caps, and promotional displays.

POS (Point-Of-Sale)—data captured at sales registers of each product sold for each consumer transaction. This data is aggregated into a count of each universal product code (UPC) sold at each store for each date. This data is often accessed through third party retail partners.

Product Stocking Event—Includes any type of event or location for which products are stocked on a retail sales floor. Product stocking events include stocking products for trade promotions, stocking products for new product introductions, stocking products for modular resets, and stocking products on regular shelf locations or turn stock products.

Product Stocking Event Plan—plans, instructions, procedures, or rules used for managing and maintaining product stocking events. Includes instructions for shipping products through a supply chain, product placement instructions for a retail store, triggers that will send alerts to users, quantity of SKU for individual stores, time periods for events, replenishment plans, moving products from low performing stores to high performing stores, and so forth.

Promotional Display—includes any tagged display, item, pallet, shipper, tray, PDQ, end-cap, marketing material such as a sign, or any display designed to be placed in a promotional area of a retail store.

Real Time—Data transferred immediately after reads, or transferred shortly thereafter or upon return of a mobile RFID reader to a data receiver connected to a network.

Retailer—refers to the owner of one or more physical stores. In this application, store or retail store refers to one physical structure for selling products or services.

RFID Data—electronic identification data transmitted wirelessly from an RFID tag. Data includes EPC data plus read time and location. May also include direction of travel of a read in the case of impact door or other gateway between a sales floor and backroom. Data can be used to determine dwell times in various locations.

Sell-through—is a measurement used by CPG and product manufacturers sales teams to determine how well a promotional event performed. The calculation is a percentage of the forecasted volume that was sold during the active promotion period plus a week (typically). A sell-through target for a typical promotion is 90%.

Store Coverage Resources or Retail Force—individuals hired by a CPG supplier either as employees or via a third party that provides a service to visit retail stores to perform a variety of audit tasks on product availability and position. In some cases, these individuals can move products from backroom to sales floor themselves, if needed.

Trade Promotions—promotional events for CPG and other retail products that are typically jointly planned and managed by both a supplier and a retailer. Trade Promotions is generally used in reference to the process, not a specific event.

Universal Product Code (UPC)—a bar code symbol for retail packaging, generally read through optical readers.

Operation

In the following detailed description of the invention, reference is made to the accompanying drawings which form a part hereof, and in which are shown, by way of illustration, specific embodiments in which the invention may be practiced. It is to be understood that other embodiments may be used, and structural changes may be made without departing from the scope of the present invention.

The invention covers use with all types of product stocking events and supply chain management. The detailed description focuses on describing how to make and use the invention for a product stocking event that is a promotional event. The principles of operation, however, apply to other product stocking events such as new product introductions, shelf modifications, and turn stock inventory.

Trade Promotions are events for CPG and other retail products that are usually jointly planned and managed by both a supplier and a retailer. Trade promotions generally follow a series of steps. First, a promotion plan is jointly created between a retailer and a supplier. Next, a supplier manufactures a product associated with the plan, attaches an RFID transponder, and ships the product to a retailers distribution center. From the distribution center, the product is shipped to individual retail stores and placed on the sales floor on a scheduled date and until the end of a promotional period.

The invention enables compliance and performance analysis of promotional events both before, during, and after promotional events. The invention receives data from RFID-tagged promotional displays—typically an electronic product code (EPC). RFID-tagged promotional displays are read at various locations throughout a CPG supply chain. Tags are read one or more times daily or during transit while passing near an RFID reader. Ideally, RFID readers are located in manufacturing facilities, at truck loading and unloading docks, and at distribution centers for both suppliers and retailers. In retail stores there are ideally multiple RFID reader locations such as at a loading door, at a box crusher, at a gateway between the backroom and the sales floor, and at various other locations throughout a store's backroom and sales floor. Retail stores may also use mobile RFID readers that can be moved through store aisles.

FIG. 1 is a diagram of an RFID-enabled retail store 100. Preferably retail stores use several RFID readers at designated locations throughout a store. The invention at least collects data from one RFID reader located at gateway 115/130 between backroom 110 and sales floor 120, or located at an impact door or other similar transition between backroom 110 and sales floor 120. A reader located at gateway 115 is preferably able to identify a direction of travel of an RFID tag to determine whether a tagged case, product, display, or employee is entering a sales floor or leaving a sales floor. Other useful locations for RFID readers include receiving door 105, and box crusher 125. As an RFID-tagged case 135 enters retail store 100, case 135 is read at reader 105. Upon case 135 being moved to sales floor 120, case 135 is read at reader 115. Product 140 is stocked on sales floor 120, and case 135 is taken to box crusher 125 and read there.

Some retailers use handheld combination barcode and RFID readers as part of an existing tracking process. Other stores may use shopping carts retrofitted with an RFID reader to provide cycle count during every use for shelf replenishment and in-store location capture of displays.

Each time an RFID tag is read, EPC and other data is collected and transmitted to a central database or computer system. For stationary RF ID readers, data can be sent in real time. For mobile or handheld RFID readers, data may be transmitted wirelessly in real time, or after returning to a base station or other data collection point.

Before an event launch date, the system collects RFID data to identify which stores have moved displays to the sales floor early. By knowing which stores execute early, a supplier can increase total volumes in a sales forecast for those stores, or send more promotional products to those stores. The invention is able to predict stock-out with sufficient accuracy to replenish a product before it is out-of-stock.

During the time from the start of a shipment of promotional items or displays through the launch time and end of the active promotional period, the invention identifies exceptions so that sales associates can take corrective action or follow-up with additional research. For any given date, retail stores are identified that were supposed to receive promotional items and which have not received all or any promotional items. Also identified are retail stores that were scheduled to stock promotional items and which have not placed some or all the promotional items on the sales floor.

Knowing which retail stores are not in compliance enables sales associates to take some corrective action during an event to get the product moved out. Corrective action may include calling a retail store manager, calling a buyer, or using traveling retail sales associates to visit retail stores and verify compliance of products or displays, or automatically sending alerts to retail stores.

The invention provides an accurate and detailed picture of the movements of a promotional display including a detailed history of when and where a tagged display has been over a specified period of time. The invention optionally sends such information as a scheduled alert message so that a traveling retail force member making a store visit can see any exceptions before entering a retail store and know what to investigate.

Figure 2:
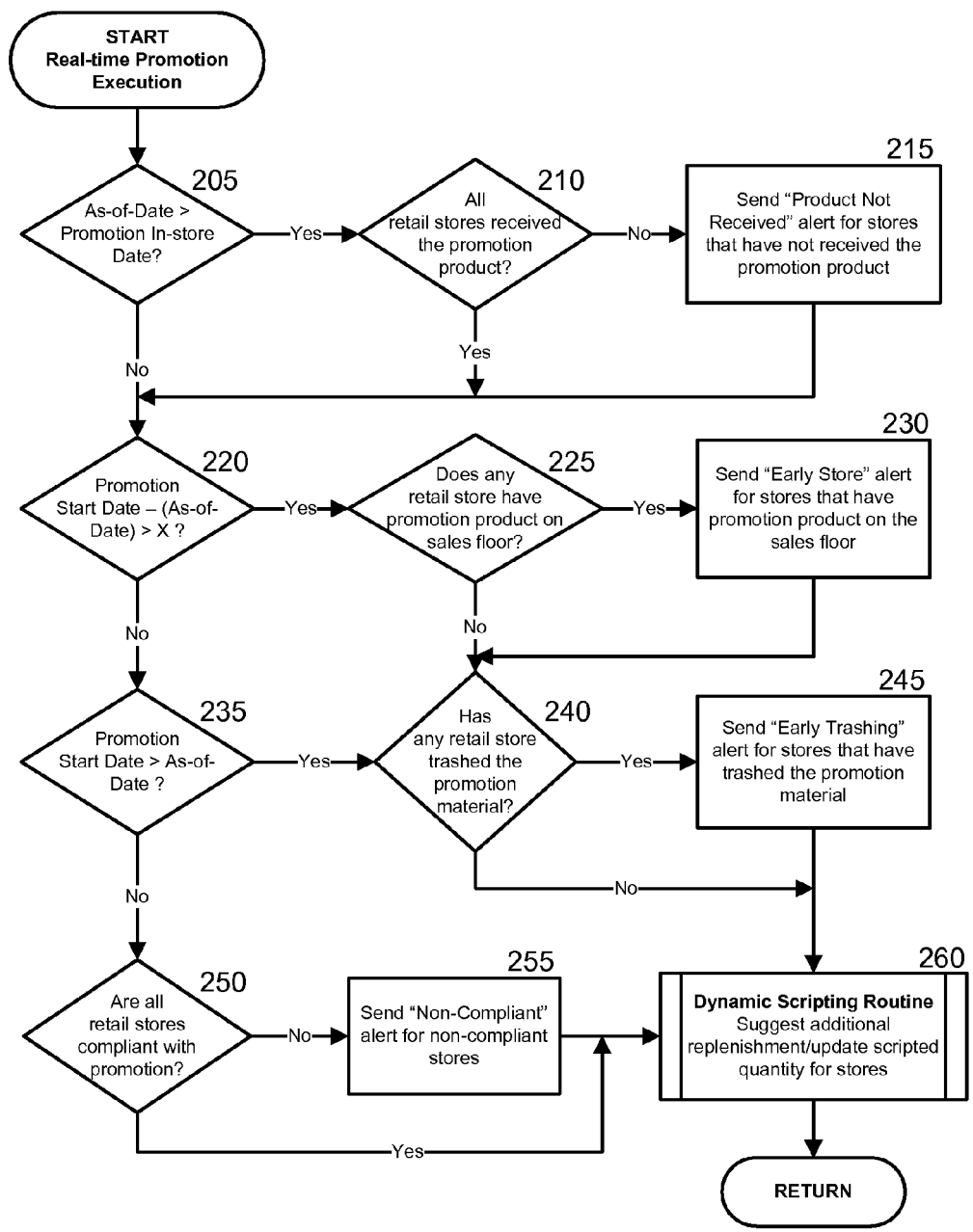
FIG. 2 is a flow chart of the promotion execution logic of the invention.

Referring to FIG. 2, the invention follows compliance of a promotion by identifying as of a given date whether a promotion was in a retail store (205) and whether all retail stores have received the promotional product (210). A promotion in-store date is a date by which a promotion product is must arrive in a retail store. The product could be displays such as pallets, or non-displays such as cases. An alert is sent (215) to stores who have not yet received the promotional product. Next, for a given date and identified promotion start an early period is calculated (220). Retail stores are identified which have the promotional product on the sales floor early (225), and an Early Store alert is sent to those stores (230). Next, for a given date before the start of a promotion (235), retail stores are identified that have trashed promotional materials (240) and an Early Trashing alert is sent to those stores (245). Next the invention identifies whether all stores are compliant with the promotion (250) and sends non-compliant alerts for non-compliant stores (260). Non-compliant stores are stores with product in the backroom or stocking incomplete. Finally the invention runs a dynamic scripting routine and suggests replenishment plans and updates scripted quantities for stores (260).

Figure 3:
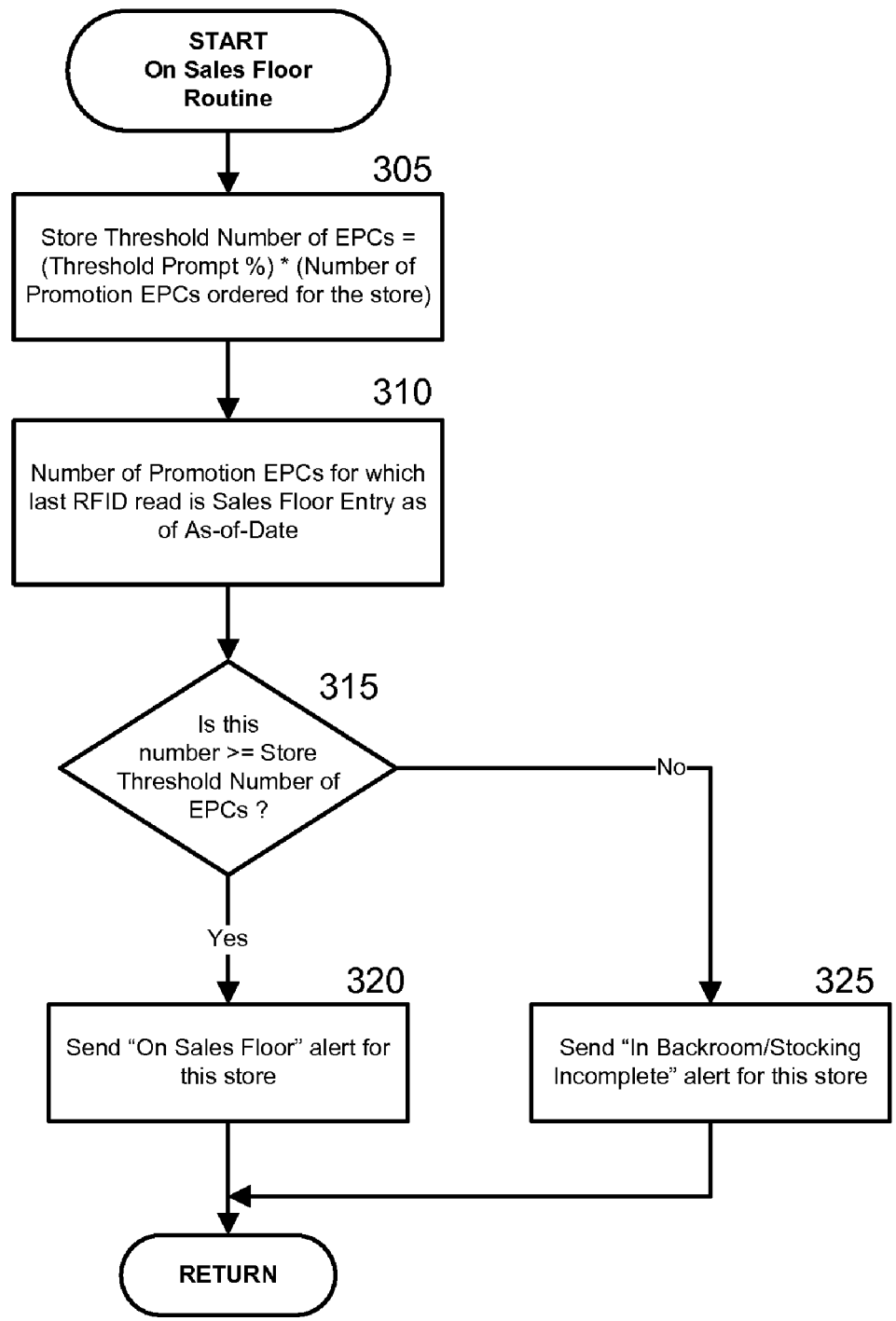
FIG. 3 is a flow chart of the process for identifying products on a sales floor.

Referring to FIG. 3, the invention runs a routine to identify products on a sales floor. First, a store threshold number of EPCs is identified (305). This threshold is a percentage of the number of promotional EPCs or products ordered for a given store. Using accessed RFID data, the invention identifies a number of EPCs for which a last RFID read is a sales floor entry for a given date (310). If this number is greater than or equal to the threshold number of EPCs for a given store (315), then this store is identified as on sales floor (320). If not, the invention identifies this store as having the product or display in the backroom or as stocking incomplete (325).

Figure 4:
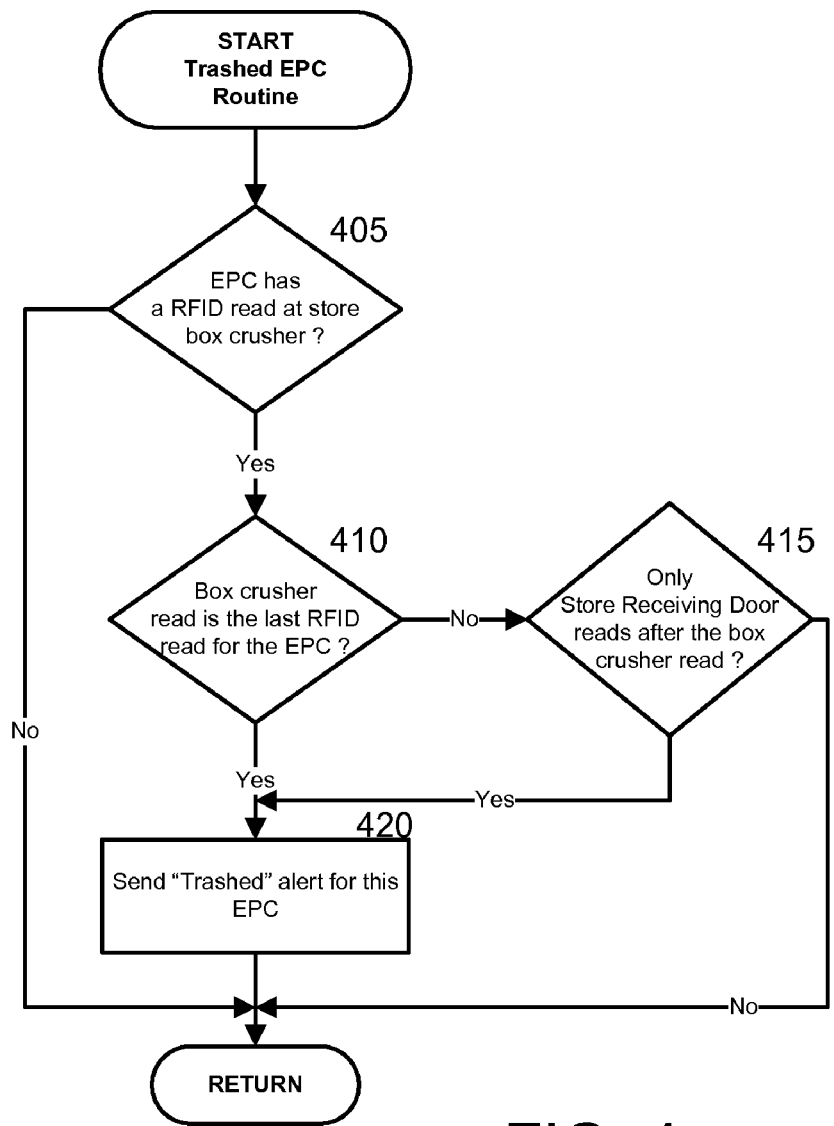
FIG. 4 is a flow ha of the process for identifying rashed RFID tags.

Referring to FIG. 4, the invention runs a process to identify trashed EPCs. First. EPCs are identified which have had an RFID read at a store box crusher (405). If the box crusher read is the last RFID read for an EPC (410), then an alert is sent for the EPC (420). If the box crusher read was not the last read for an EPC, but the only subsequent reads were at a store receiving door then an alert is also sent (415). There are multiple reasons for an EPC that is trashed early and the associated store being non-compliant. For example, a display corrugate may be trashed while corresponding product is stocked as turn stock. Also, the display corrugate may be shipped with several cases of product designed to replenish that display corrugate, but then the corrugate is trashed after the initial products sell-through with out store associates replenishing the display.

Figure 5:
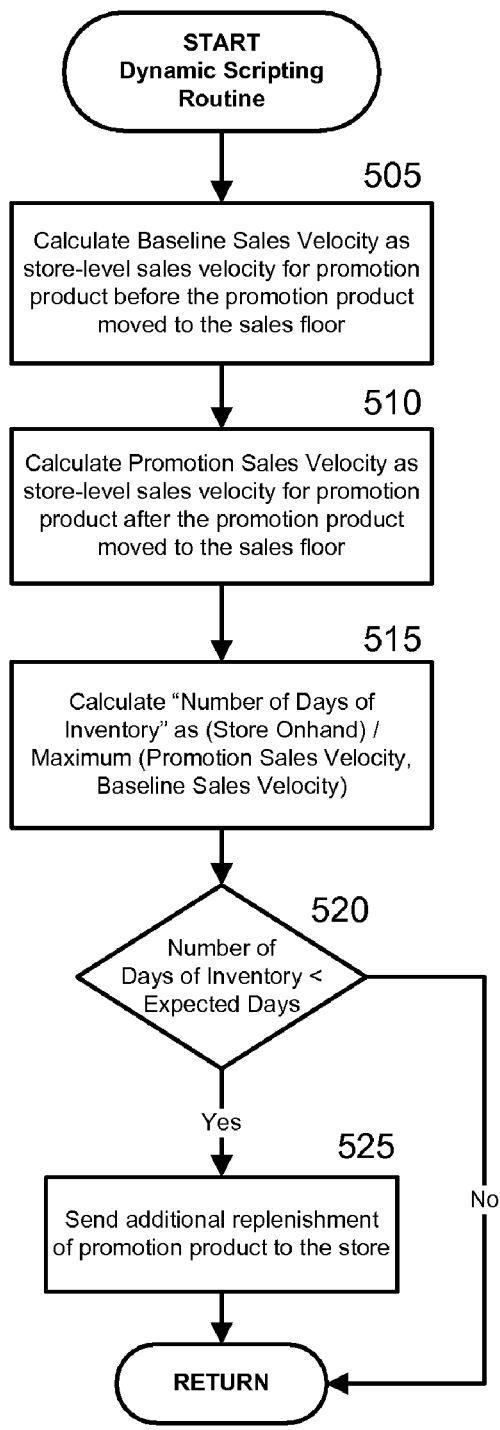
FIG. 5 is a flow chart of the dynamic scripting routine.

Referring to FIG. 5, the invention runs a dynamic scripting routine. The invention calculates a baseline sales velocity as a store-level sales velocity for a promotional product before that product is moved to the sales floor (505). A promotional sales velocity is then calculated for a promotional product after that promotional product is moved to the sales floor (510). A number of days of having the product on hand is divided by a maximum sales velocity (515). If the number of days of inventory is less than the expected days of a product event (520), then the invention sends an order or alert to send more product to replenish inventory (525).

While many of the product stocking issues and routines are similar across the various product stocking events, there are some differences in challenges between promotional displays and tagged cases, and overlap between the two. RFID-tagged cases are cases or containers of products that get unpacked and stocked onto regular shelves. It is common for an RFID transponder to be attached to a case of products instead of products themselves. For promotional displays, the transponder is commonly attached to the display itself and not individual products.

It is common for a supplier to have products in both a promotional area and a regular shelf area. For example, a supplier creates a corrugate display for selling shaving blades. The display itself may have attractive art work, be RFID-tagged, and placed near a checkout register or in an action alley. This supplier also sells shaving blades on regular shelves. The product contained in a promotional display may be sold as a multi-pack, or these products could be identical. In the situation where promotional stock has the same SKU/UPC as the turn stock, the lift associated with the promotional product is more difficult to measure. To accurately measure lift, the invention subtracts a baseline sale of turn stock.

In another example, a soup supplier may promote a soup product in conjunction with a sporting event. An associated promotional display may simply be a stack of soup cans at an end cap or on a pallet placed in an action alley. Store associates, however, may not stack soup cans at the designated end cap or promotion area, but instead may just use the soup to replenish a regular shelf location, or otherwise misplace the soup product. In a related example, the soup supplier does not have a promotion running, but is simply replenishing turn stock. Soup cans are likely shipped in cases or boxes, brought out to the sales floor (read at the impact door), opened, emptied by stocking a shelf with the cans of soup, and then the case is destroyed. In some stores this replenishment may not happen at the appropriate times. In practice, cases of soup might be sitting in the backroom and not yet stocked on the shelf.

The invention detects such out-of-stock and non-compliance conditions. In practice, RFID data is incomplete. The software and hardware used in RFID systems is not perfect, and frequently transponders are not read due to interference, a damaged transponder, malfunctioning reader, or related problems. The invention compensates for missed reads by inferring data from incomplete RFID data and/or from other sources. Other data sources include historical or baseline information from prior point-of-sale or point-of-sale/RFID events, and perpetual inventory data. The invention uses historical and perpetual inventory data to both identify and predict shelf out-of-stock conditions so that store personnel can be alerted.

Figure 6:
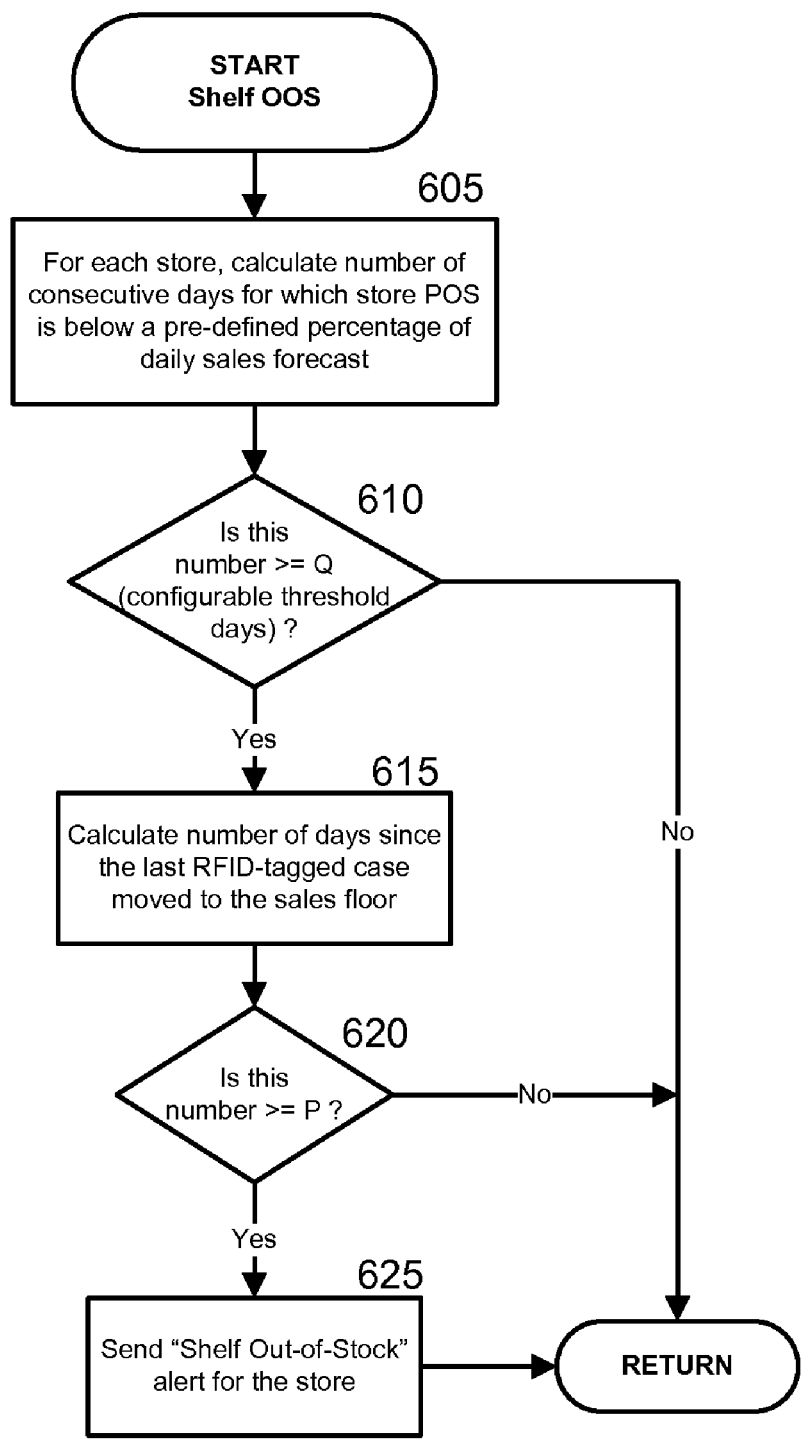
FIG. 6 is a flow chart for shelfout-of-stock detection.

Referring to FIG. 6, the invention runs a shelf out-of-stock detection routine. For a given retail store, the invention calculates a number of consecutive days for which store point-of-sale data is below a pre-defined percentage of a daily sales forecast (605). A daily sales forecast is the percentage of sales for a given day of the week based on historical sales, divided by a currently weekly sales forecast for a given store, if this number is greater than a configurable threshold (610), then the invention calculates since the last RFID-tagged case moved to the sales floor (615). If this number is greater than or equal to "P" (620), then the invention sends an alert to a store that there is a shelf out-of-stock condition (625). "P" is equal to a number of days in a forecast period, multiplied by a number of EPCs in an RFID-tagged case, all divided by a current sales forecast for a given store.

Analyzing a promotional event after completing the event includes using a complete point-of-sale dataset that indicates exactly what volume of product was sold through by a given store as a measurement of performance. Lift data is also used as a measurement of performance. Using point-of-sale data and RFID data reads, the invention identifies compliance of all stores for an event and correlates such compliance to total revenue for the event. The invention also identifies relationships between sell-through for each store and the date when the promotional displays or items were placed on the sales floor. Such information is useful to determine which stores are better or worse performers, to make adjustments to sales forecasts and sales plans. For example, the present invention increases forecasts for stores that consistently execute early and sell-through prior to promotion launch dates or end dates.

Retail stores are grouped by performance category. Basic categories are "Early," "On-Time," and "Late." A store is considered to be Early if the store placed a display or item on the sales floor X number of days before the launch date of the event. A store is considered to be Late if it placed a display or item on the sales floor Y days after the launch date of the event. Any store that placed the first display or item on the sales floor between those times is considered to be On-Time. It is common that, X is typically 0 or 1, and Y is 4 or 5 days for a 1-week promotional event. A first display on the sales floor might not mean On-Time for all promotions. In scenarios where there are multiple displays/cases shipped to a retail store, a supplier might insist on a certain percentage or all of it be placed on the sales floor.

Some stores, however, never place promotional items on the sales floor, so additional categories include "In Backroom" or "Stocking Incomplete." Another category, "Not In Store," counts the number of stores that were scheduled to receive the promotional item or display, but did not receive it.

Once each store has been placed in a group, corresponding sales performance can be compared by category of store performance, e.g., impact on average sales for On Time versus Late groups. A reverse analysis is also applicable by grouping high performing stores and then identifying which category (Early/Late/On-time) they fall into. This analysis finds a correlation or causal analysis between high sales performance and Early or On-time execution.

To determine if a given store is Early, On-Time, or Late, the invention uses data from the last time that an EPC entered the sales floor, and not the first time it entered. When there are multiple EPCs at a particular store, the invention uses the last sales floor entry time of the earliest EPC.

Category placement calculations take into account "As of" dates when determining status. Only those EPCs that are on the sales floor on the "As of" date are considered in the equation: min(last sales floor entry time). An example has an "As of" date is Apr. 27, 2006, there are 6 EPCs in the store, and 3 of those 6 are currently on the sales floor with the following times:

EPC—Last SF Entry Time: Apr. 23, 2006 13:01
EPC #2—Last F Entry Time: Apr. 22, 2006 15:02
EPC #3—Last SF Entry Time: Apr. 27, 2006 01:31

If the promotion start date was Apr. 26, 2006, with a setting of 1 day before the start date to consider a store early, then the store with this data would be counted as Early because the earliest last sales floor entry time of EPC #2 was on Apr. 22, 2006 which is before the deadline of Apr. 25, 2006 (early deadline is Apr. 26, 2006—one day).

The invention uses adjustable thresholds for reporting the correct number of EPCs on the sales floor count for a store to be considered as early. For a store having 6 EPCs and a threshold prompt set to 100%; all 6 EPCs would need to be on the sales floor on the "As of" date to be considered for the early/on time/late calculation. If only 3 EPCs were on the sales floor, then this store would be categorized in the "Stocking Incomplete" or "In Backroom" category. If the threshold prompt were set to 50% or less in the above example, then the same logic in the original statement above would apply and the store would be counted as Early.

Sometimes displays are destroyed before an event. Upon arrival of a display pallet store associates may break apart the display or take items out of the display and simply put the items on the shelf instead of moving the entire display onto the sales floor. From a supplier standpoint, this is a major issue because suppliers often spend hundreds of dollars for each PDQ or display pallet only to have the display thrown away without being used.

Some stores discard displays early because they do not have enough space to either place the pallet on the sales floor or store it in the backroom. In the past, suppliers could not determine if displays had been trashed prematurely. The present invention, however, identifies displays that have potentially been trashed or that have been read going to a box crusher prematurely. With this information suppliers can solve this problem with retailers for future events.

This event can be detected from RFID data by comparing the time of the last sales floor entry of the display pallet tag to the time when it was seen at the box crusher. If such an EPC read is on the same day (or less than X days), then it is likely that the display pallet was thrown away without being stocked on the sales floor. Also, if the display pallet was never observed on the sales floor, just at the box crusher, or only read at a receiving/exit door after being read at the box crusher, that would indicate the display was discarded without being placed.

The present invention compensates for exceptions in the RFC supply chain tracking system. Exceptions on promotional display data can be due to hardware issues, physics issues, process issues, or other executions errors. Example exceptions include a display that passed by a store reader was not read and recorded, a display pallet is destroyed, or a display was not shipped to an RFID-enabled store. Placement of RFID tags can impact reads. A pallet tag might be expected to stay on the sales floor for the entire event while a tag on a PDQ's removable lid might be seen in the backroom immediately after its contents are placed on the shelf.

The arrangement of RFID readers in a backroom can affect data reads. Some stores may have a box crusher RFID reader very close to a receiving door RFID reader causing stray or duplicate reads making it difficult to determine whether there is a hardware issue or whether a retail store has a stocking process problem. Depending on whether daily or cumulative reads were considered, a display with stray reads could be considered on the sales floor or in the backroom.

Exceptions are measured in terms of read rates. Week-to-week comparisons of all displays that were seen at the supplier site are compared to all read events up to the current date to get a picture of read rate performance.

The present invention is operable to group retail stores by sales territories or similar groupings. Some companies with store coverage employees or brokers assign a set of stores to a person for scheduled store visits. It is useful to have these employees or brokers act on RFID exceptions that could be happening in assigned stores. The invention filters store lists according to pre-defined groupings. These groupings exist as part of a sales organization hierarchy with other information such as the manager for the territory or region, etc. A typical grouping can contain 10-20 stores. This organizational data is loaded into the system from an external source. For specific reports, only those stores that are part of a specific group can be selected.

There are different dwell time intervals that are helpful in understanding how products have moved in aggregate inside stores. Backroom Dwell Time is the amount of time products spend in a store backroom before making it to the sales floor. Sales Floor Dwell Time is the amount of time displays or PDQs spend on the sales floor before they are returned to the backroom or trashed at the box crusher. Store Dwell Time is the total amount of time that a display or tag spent in a store from its first arrival to being destroyed. Aggregating these metrics for products in each store, and across stores, provides insight into how successfully an event was executed.

The present invention enables sales analysts and other members of the sales team to understand EPC movements in as clean of a way as possible. The invention identifies when the product is in the backroom and when it is on the sales floor based on an expected flow, but allows for variations in received data.

Displays are expected to follow a specific flow. First a display arrives at a store backroom; next the display is moved to the sales floor; next the display is destroyed at a box crusher; finally, the display is removed from the store via an exit or receiving door.

In practice, EPCs do not follow this expected behavior much of the time. Instead, it is common to observe EPCs that appear to move back and forth between the sales floor and backroom many times in a short time period and over several days, EPCs that appear on the sales floor before entering the backroom, or never arrive to the backroom, EPCs that appear at the box crusher before entering the sales floor or are never seen at the box crusher at all, and EPCs that are never read anywhere in the supply chain.

Unexpected behavior may be due to low readability of some EPC-tagged items, close placement of readers and antennas in backrooms causing stray reads as EPCs move past the box crusher or impact doors on their way to and from their backroom storage location. Other unexpected behavior includes a retail store that is not online or capable of transmitting RFD data comes online and begins to share EPC data, or a retailer has hard-coded movement logic so that a read at a box crusher means the product is on the sales floor and available for sale, when it actually is not.

Other scenarios include store associates using non-standard processes in the store, such as taking a box out to the sales floor and partially stocking the shelf so the box returns to the backroom with items leftover, opening two boxes of different products and putting some of each item in the same box, and removing EPC tags/labels and putting them in someone's pocket, or just throwing them into the trash or box crusher, etc.

Another important exception is that not all stores in a retailer's chain contain RFID tracking systems. The invention maintains a list of active RFID-enabled stores, and identifies which stores currently provide EPC data and that are expected to have particular products. The invention includes data from these stores in analysis. Stores with no EPC tracking are usually excluded from promotional event analysis.

The present invention addresses challenges from using EPC data collected by retail stores. Since it is very likely that exception information reported by the invention will be shared with a retailer, information is reported such that a retailer can independently confirm or validate any questions or conclusions using a retailer's EPC system. A benefit is that when suppliers share such reports with retailers, retailers can improve the quality of their systems both with hardware and software and supply chain procedures.

Accurate analysis and reporting of EPC data is important to avoid a potentially embarrassing situation of false assertions made by a supplier because of errors in analysis or incorrect assumptions from data cleansing or transformation. There are several logic steps that the present invention runs to avoid such situations. In one step, the invention verifies that all metrics calculated can be explained either in the system or in documentation in such a way that can be easily understood. Some of the primary reporting and analysis is taken from a retailer's status information. For example, if the invention receives a box crusher read but the corresponding product has not been seen moving to the sales floor, then the invention maintains one version or metric using a retailer's "on sales floor" status to drive a report, and maintains a possibly different metric to provide a separate cleansed version for comparison. Both metrics can be selected and compared to actual data. The invention optionally provides multiple views of the same analysis to enable a user to independently determine quality of the data. Access to source data enables an end user to view EPC history for validating calculations.

CPG sales analysts use "sell-through" data to determine if a promotional event was successful. This measurement indicates if the amount of expected "uplift", or increase in sales volume, during the promotional event actually happened when it was expected to happen. For example, if a CPG supplier tells a retailer that the CPG supplier expects to sell 10,000 units for a 1-week promotional event, the supplier might agree with the retailer to measure point-of-sale activity for the one week before and two weeks after the event. The actual amount of time used to measure sell-through varies from one type of event to another. For events using printed advertising flyers that appear in local newspapers or at the front of retail stores, sell-through may be measured for two weeks, while other events may be shorter or longer.

If in the above example, a supplier and retailer agree to a 90% sell-through (and/or uplift), and after four weeks there is an 87% sell-through, then both the retailer and supplier have concerns. The remaining items may completely sell-through over the next few weeks, but leaving these items on the sales floor may clog a retailer's already crowded store or backroom. A retailer may want to return remaining items to the supplier—especially if a second supplier has negotiated space for a different product. If products were seasonal or holiday items, the retailer might want to dispose of the products altogether.

When a supplier misses an agreed to sell-through target or lift, a retailer may be less willing to participate in future events with this supplier. The retailer may also ask the supplier to lower forecasts for future events to make sure targets are hit. Lowering forecasts results in less revenue to the supplier and could potentially create stock-outs if stores run out of a product too soon.

Sell-through calculations are straight forward for new items. If a promotion is done on an event that would otherwise normally be in the store during the same time (such as an existing soup item), then some baseline volume must be subtracted out of the sales data to determine the uplift created by the promotion. This is the amount of increase in volume beyond what would have been sold in absence of a promotional event.

The concept of baseline sales data is necessary for promotional events where the item is sold from a promotional display location, such as an action alley or on an end-cap in addition to its regular shelf location (or home location) in the store. A Retailer point-of-sale data systems may only report the Total Item Sales numbers for each SKU/store/day combination.

Since measurement for the number of sales from regular shelf locations may not be available, the best estimate is to use some sort of historical baseline for an average day's sales for a given item. This baseline data is added to a data model for use in analysis. Without accounting for baseline sales, simple sell-through calculations may exceed 100%.

The invention allows users to upload baseline sales data as determined by a user, customer, or retailer. Additional data fields associated with sales data can also be uploaded. Sales data can be loaded from any date range or from any UPC. The invention also allows mapping any historical baseline sales to a different UPC than that of the item that was actually sold. This is useful for cases where a promotional item has its own new UPC, such as a CPG bonus pack. The invention also allows linking the start date of promotional sales data to the start date of baseline data. This is often the same day of the week, but may be reconfigured during the analysis phase as it is reviewed by analysts and managers.

For sell-through calculations it is important to link point-of-sale data with EPC movements. Since point-of-sale data is reported from retailers by universal product code (UPC), and some promotional events have several UPCs included in it, there is a need to link sales of certain UPCs to the movements of a specific stock keeping unit (SKU). In some cases there will be a 1-to-1 relationship between a UPC and an SKU, while other cases will have a many-to-1 relationship.

Store-level sales information is often stored by third parties or at partner extranet sites. Sales data from such sites is transmitted as an automatic, permanent data feed or manually uploaded as needed. Data is uploaded for multiple stores and from multiple retailers. Point-of-sale data is typically available for all stores of a given retailer, though RFID data may not be available for all stores.

For use cases where promotional items are currently in stores as open-stock, it is common to subtract out the typical daily sales numbers of these items from a non-promotional period to determine what uplift in sales happened during the promotion. The invention optionally receives a separate baseline sales dataset to determine this uplift automatically. The invention keeps a history of records where the point-of-sale quantity was detected to be different from the prior update for the same UPC, date, and store number. There are various sell-through calculation methods available with various configurations such as assuming that the probability of buying from a shelf and from a display is the same.

For uplift calculations, a baseline sales quantity is divided by a total promotional sales amount. Optionally a net uplift calculation method calculates incremental sales uplift instead of the total sales volume over a baseline. Seasonal items or yearly promotional events use same-store sales from a prior year to calculate a baseline. The invention displays uplift in various forms such as a time-series, or total uplift as a graphical meter.

Total sales revenue can be calculated by either capturing the number of units sold for an item in a store on a given day, or by actual retail sales in dollars. Using a fixed per unit price to calculate a total sales revenue number is a simple calculation, however, this is an approximation because in reality each store can price the same item at a different price point by store manager discretion or for competitive reasons. This allows analysts to understand if abnormal sales activity is due to price discounting at the store level.

The present invention provides a forecasted or expected quantity adapter, or script adapter. The expected quantity adapter includes information about a forecasted amount of each item. This data typically comes from files used to upload forecast data to third parties. Each script file is date-specific to accommodate several revisions during the promotional event as additional quantities are added for stores that may be running low. Script files may also include a recommended rapid re-order plan for selected stores, and output in a format that can be immediately submitted to retailers or third parties.

Users can upload script data from all stores (even those that are not currently RFID-enabled) for SKUs relevant for a selected promotional event. This allows for cases where RFID-enabled stores are activated during a promotional event's execution time period. It will also enable some RFD versus non-RFID reporting.

A "script" is a file sent from a CPG supplier to a retailer containing information about the supplier's desired plan for where and when items should be placed. The retailer, however, may choose to change the supplier's plan and re-direct products based on store traits. Store traits are a series of attributes describing each store. Some traits can change daily. For example, if a supplier's script plans to send a volume to a store with a trait such as "Flood Damaged," the retailer will redirect those items elsewhere until that trait is removed. There are hundreds of possible traits.

Retailers can generate and transmit an actual plan they are executing. Data from a retailer's plan is in the same format as the script file. A CPG supplier can choose to use either data source to represent a forecast. An end user can choose which kind of forecast information to use when loading this data file. Multiple incremental script files per promotional event can be created and associated with different dates. Scripts are also created during a promotional event to replenish stores that had sold out of a products. Script files can be kept as individual files based on the date when they were sent, or as a single rolled-up script file per event.

The present invention enables end users to create or modify a promotional event in the system. Information captured around a specific event may be used within reports to define certain time periods such as when the promotion was actually scheduled to be running and which products to include, so that end users do not need to repeatedly enter such dates or items for each generated report.

In some cases, there is no known source system for this captured event information from CPG suppliers or from third party data providers. This information commonly resides in various documents and plans of people involved in managing a promotional event. In such situations, these data elements can be created or modified by the end user manually.

There are multiple data elements that can be associated with promotional events. "Start/end of shipping" defines a period when shipments from a supplier's distribution center that contain EPC-tagged items will ship. "Start/end of promotional event" defines a period when promotion items are expected to be on the sales floor and available for sale. "Start/end of sell-through period" defines a period for which a sales team intends to analyze sales data to determine if a target has been met. Such a period is often longer than the promotional period itself. "Number of days before start date to consider store as Early" is the number of days before a promotion start date to consider a store as early if EPCs are on the sales floor on or before that date. "Number of days after start date to consider store as Late" is the number of days after a promotion start date to consider a store as late if EPCs are on the sales floor after that date.

These time windows are used to define certain periods within a promotional event. For example, sales or movements between the start of shipping and start of the promotional event are considered to be "early". Sales and movements between the start and end of the promotional event are in the "active" phase.

In addition to the name of a promotional event and the dates maintained, data elements are maintained as part of a promotional event. Each such data element is provided for each UPC within a promotional event to map point-of-sale data back to EPC movement data as used in other reports. There are several data elements that can be used; the name of a promotional event, a retailer's item number, a retailer's item name. UPC code of an item contained within a retailer's item number, UPC item name, quantity of UPCs per item, UPC unit price, and UPC unit cost. The invention can also maintain data elements for a sales organization hierarchy to determine which stores or distribution centers appear in a report for a designated territory.

The present invention can display several customizable reports based primarily on EPC movement data.

One useful report is a store-level promotion tracker. This report identifies current status of promotional items at the store-level by determining which stores have received EPCs, placed them on the sales floor, or trashed them at the box crusher. This report optionally displays tracking for non-display based promotion items such as case promotions.

There are several metrics used for a store-level promotion tracker report. "Total Received" is the count of unique EPCs that were read at any read point in a particular store during a selected time period. "In-Backroom" is the current backroom inventory. Ideally, EPCs read at the receiving door after being at the box crusher are not counted, because they really are not in the backroom even though a retailer's product status reports it as such. When counting those EPCs in the backroom, identification down to the tag level is necessary to expose this detail.

"On Sales Floor" is the current sales floor inventory. Preferably EPCs that are seen at a receiving door after being read at a box crusher are not included, as that will cause this number to decrease and appear as if less product was on the sales floor. Nevertheless, having a tag-level drill down provides clarification to users that EPCs were on the sales floor.

"Trashed" is the count of trashed EPCs. This is the count of unique EPCs that either were last read at the box crusher, or have only receiving door reads after the box crusher read. In the case of multiple events, the invention determines which box crusher read to use.

"Average Back Room Dwell Time of Sales Floor EPCs" is the average time spent in the backroom for all EPCs at a specific store that are on the sales floor. This dwell time can be determined by subtracting the last sales floor movement time from the first backroom arrival time. EPCs that have never arrived to the sales floor do not need to be included in this calculation, so their values can be left blank. "Average Back Room Dwell Time of Back Room EPCs" is the average time spent in the backroom for all EPCs currently in the backroom. This number can be determined by subtracting the current time from the first backroom arrival time.

"Average Sales Floor Dwell Time" is the average time spent on the sales floor in the latest cycle to the sales floor. Alternatively, this is the time between the max(last sales floor entry via transition doors) and the next read at the transition doors moving to the backroom. If an EPC enters the sales floor via the transition doors, but has not left (i.e. is still on the sales floor), then the time up to the report's "as of" date should be used to determine sales floor dwell time.

"Average Store Dwell Time" is the average time spent in the store using the first backroom read usually at store receiving, or min (store—which could be either sales floor or backroom) and the first box crusher read or max (box crusher). Use of thresholds is useful to highlight certain exception situations such as where there are EPCs in a backroom, but none on the sales floor, or where there are no EPCs read in a store.

Another useful report is a drill down from store to EPC list. This report allows an end user to select a store and see a corresponding tag-level detail report which includes a list of EPCs for the previously selected product at that store.

There are several metrics used for drilling down from store to EPC list. "Current Location" is an EPCs latest business area. "Latest Read Point" is the read point of the latest read event for the EPC. "Latest Read Event Date/Time" is the date/time of the latest read event for the EPC. "Store Arrival Date/Time" is the date/time of the first read for this EPC in a selected store at any read point. "Last Sales Floor Date/Time" is the date/time of the last sales floor entry for this EPC using the transition door read point only. "Last Box Crusher Date/Time" is the date/time of the most recent box crusher read event.

'Back Room Dwell Time Before Stocking' is the total amount of time an EPC spent in the backroom before going to the sales floor. This dwell time is determined by subtracting the first time it entered the backroom from the last sales floor entry.

"Sales Floor Dwell Time" is the amount of time an EPC spent on the sales floor on its last cycle. This dwell time is determined by subtracting the last time the EPC entered the sales floor (at the transition door read point) from the last time it left the sales floor to go to the backroom (at the transition door read point).

"Store Dwell Time" is the time spent in the store using the first backroom read usually at store receiving, or min(backroom) and the first box crusher read or max (box crusher). Drilling down on an EPC link in this report accesses current standard track & trace by read point report for this EPC. Thresholds can be configured to highlight certain exception situations such as EPCs that have been on the sales floor but having a last read point at the receiving door (these are EPCs that have likely been trashed) or EPCs that have never been seen on the sales floor.

Another useful report is daily movements by store. This report is similar to a daily detail report. This report shows movements into the store backroom and sales floor on a daily basis, so that movements can be compared with other offline data as needed for analysis.

Other reports can provide a snapshot of events for a single day or by row when there are large quantities of store data. It is possible for certain outlier promotional events, to have results output that create more than 32,000 rows of data. For example, a promotion at 500 stores lasting over 4 months (120 days) and including 2 products would create over 1200300 output rows. A secondary prompt after selecting a promotional event allows the user to reduce selections in report filters to either a smaller date range, fewer products, or fewer stores.

The present invention displays several customizable reports based on EPC movement data and point-of-sale data.

One useful report compares daily point-of-sale data and EPC sales floor movements. A report and chart shows a comparison of EPC sales floor movements of tagged items to the sales of linked UPCs rolled up for all stores. Report output includes both grids and a chart and can page—by the item/product to allow for viewing different metrics on the same chart. For the case where multiple UPCs are contained within the same item, a stacked bar is used for the UPCs so the user can see sales of each UPC relative to one another versus all in a single bar. Optionally, this report is displayed in a cumulative-by-date version for all metrics.

Time ranges can be subdivided or grouped into certain periods, such as "Early," meaning before the launch date, "Active" meaning during the promotion dates, and "Late" meaning after the promotion end date. This is optionally displayed as separate groupings on the same report or three separate versions of this report with different input parameters.

Another useful report identifies a first sales floor stocking event to sell-through. This report looks at sell-through performance as compared to when corresponding EPC-tagged displays or items were placed on the sales floor in each store. A user provides a non-zero "threshold" level to identify a "stocking event" to apply to all stores. The threshold is the minimum percentage of that item's forecast appearing on the sales floor at each store. The stocking event is a date by which this event has happened. A percentage captures the use case for both case-tagged and display-tagged promotions. For displays this threshold might be a high percentage and for case-tagged events, this might be a low percentage.

For example, for a pallet display event of item A, Store #123 has a forecast of three units. On October 10, one EPC of item A moved to the sales floor. On October 12, the other two units moved to the sales floor. If the threshold selected was 50.1-144%, then the First. Stocking Event would be October 12 for Store #123. If the threshold selected was 33.4-50%, then the first stocking event would be October 12 for Store #123. If the threshold selected was 0.1-33.3% then the first stocking event would be October 10 for Store #123, Store #234 has a forecast of one unit. On October 12, one EPC of item A moved to the sales floor. If the threshold selected was 0.1-100%, then the first stocking event would be October 12 for Store #234. Store #345 has a forecast of two units. On October 11, 1 EPC of item A moved to the sales floor. If the threshold selected was 50.1-100% then there has been no first stocking event. If the threshold selected was 0.1-50% then the first stocking event was on October 11.

Another useful report is percent of days in compliance to sell-through. This report looks at the percent compliance based on the duration of a promotional event. Percent of days in compliance is defined as the percentage of time of a promotion period where there were EPCs on the sales floor. For example, if the promotion period is 7 days starting on Jan. 10, 2006, and an EPC-tagged display first arrives on the sales floor on Jan. 11, 2006, the percent compliance is 6 days/7 days (85.7%) for that display at that store. As in prior reports, a user may select a threshold that defines the percent of the forecast to indicate whether or not the store was in compliance. Setting a very low threshold would be equivalent to counting any EPC movement to the sales floor as in compliance. This report requires the duration of a promotional event to be defined in advance and UPCs used to calculate sales and sell-through to be linked to EPCs.

Another useful report is percent of stores by a date with sales floor movement over a threshold number. This report gives a picture on a daily basis on what percent of stores are in compliance as measured by moving a certain percentage of a forecasted amount onto the sales floor. The user selects the percentage on sales floor level to determine which stores should appear on the list, for example; if there was 1 pallet display per store, a user would select 100% as the level to see. The invention can identify revenue for total sales to date for all RFID-enabled stores, and sales revenue for stores that are in compliance.

The present invention displays various reports by time phases to identify the number of stores meeting the threshold during dates within phases Early, Active, and Late. These reports help to identify where stores have placed over a certain percentage of scripted volume on the sales floor prior to a launch date, and the corresponding sell-through data.

One such report identifies stores having EPC items on the sales floor above a predetermined EPC threshold percent.

Anther report identifies an average time between alert thresholds. This report identifies the time between hitting the threshold for sales floor movements and the threshold for sell-through (in days). This report helps identify the quality of an indicator of data from sales floor movements. If 100% sales floor movement always means 100% sell-through in two days, then this is a usable planning metric. Thresholds are dynamic based on what a user sets. Thresholds allow for multiple iterations with various combinations. The time interval is from the start of the promotion period through a selected end date. This report may be used iteratively with different thresholds to see the effect on how the days metric is computed.

Another report identifies days of unmet demand. This report shows how many days each store did not meet a forecast over the active period of a promotional event. The demand is defined as a straight-line average over the active period. For example, if a promotion is seven days and the scripted amount is one pallet for store #123, then the demand for store #123 is 1/7 (14.2% of the potential UPCs to be sold) per day. If for each of the first three of the seven days of a promotional event, store #123 sold less than 14.2% of the potential UPCs, then Days of Unmet Demand is three for that store and SKU.

Another report displays store performance over multiple events. This report identifies which stores have performed best over multiple promotional events, and therefore should be considered for potential forecast increases in future events as a result. The primary metrics to evaluate performance include how frequently a store placed items on the sales floor prior to the launch date and if the store sold through those items, thereby justifying a potential increase in forecast. Optionally, total sell-through is included for comparison. A threshold value is set by a user for this report and the same threshold value will be applied for all calculations, even though promotions were different events.

The present invention also provides a promotional event status summary dashboard. This report provides a quick view of the overall status of a single promotional event. Layout and placement of data is configurable. It includes several key metrics rolled up on one page. There are many available metrics and data elements such as logo, title, product descriptions, and other metrics as discussed above.

Another useful report displays pallet exceptions. This report identifies how long a display spent on the sales floor (if at all) to determine if a store might have discarded a display too soon. This exception can be determined by comparing the time that a display entered the sales floor to the time it was seen at the box crusher. If that time was less than a certain specified amount (e.g. one day), then that store may be suspected to have discarded the display without stocking. Also, this would include stores where the display was seen only at the box crusher, but not moving to the sales floor through the transition door read point. Data for entry to the sales floor comes from the transition door read point only. Other read points do not need to be considered for movement to the sales floor. For a selected promotional event and a threshold of a number of days to consider, the invention identifies exception stores.

Another report identifies EPC read rates by read point type. Read rates are determined by counting the unique number of EPCs seen at any supplier site during a selected time period, then comparing those reads to read events at any read point type at the retailer. This comparison covers the entire time history up to the present or last data load. Each EPC preferably belongs to one week on the supplier counts, so the first read at any read point of the supplier's site should identify a scheduled week.

As with other read rate reports, all retailer or partner reads are counted up to the latest data available and are not filtered by date. The calculation for a read rate is (actual # of EPCs seen at retailer read point X)/(# of EPCs seen at the supplier for a selected week), with the expectation that we are comparing individual unique EPCs by serial number in the numerator and denominator. A start and end time period (weeks) and a single Product/SKU (i.e. only one GTIN) is selected. For performance reasons, multiple GTINs should preferably not be allowed to be selected.

Another report identifies and details compliance of promotional displays. This report displays both summary statistics on how well a promotion is progressing in addition to details about individual EPCs in each store. This report is more useful for EPC-tagged displays than for case-tagged promotional events where large numbers of cases are expected at stores.

Promotion display compliance reports include many data elements such as global trade item number, customer item number, promotion start date, promotion end date, group identification, group attribute, stores receiving product, stores with displays on sales floor, exception stores, EPC compliant stores, early, on-time, late, stores with no reads, store received date, in backroom, on sales floor, dwell time in backroom, and trash.

For those stores where the count of EPCs on the sales floor is equal to 0, the invention is configurable to send alerts or identify such stores. Other reports can identify key performance indicators.

Another report monitors backroom inventory during a promotional period. Subsections that are useful for this report include: received (on the same day) but stayed in the backroom; received and moved to sales floor; inventory movement from backroom to sales floor; and inventory movement from sales floor to backroom. This report looks at the net movement of inventory at the end of a day while categorizing inventory movement into different sections.

Another report generates a script file based on live data during a promotional event. This script file is a recommended rapid re-order plan for selected stores and is output in the form that can be immediately submitted to retailers in a format compatible with third party retail partners.

Another report identifies sales uplift and sell-through for selected stores. This report takes a store list as an input from another report and then displays the script/POS details for a group of stores. For example, after running promotion tracker report, the invention applies filters to get stores with one or more trashed displays. POS details for this specific list of stores as a group is displayed and becomes a page by field for the report.

The present invention provides many data entry options to users. Users can add or update any product master data including extended attributes through a web-based user interface. Users can optionally mark products as "inactive" to hide products from any list of products available to edit. Users are able to add or update any promotion configuration mapping tables including all attributes through a web-based user interface. This includes promotional events, promotional product map, retailer product map, and promotion product serial number. Users can lookup and edit individual records in the source data (rather than having to reload an entire CSV file) for minor editing tasks. These records include promotion forecast (script), active stores, partner sites, and site groups. Users also have the option to upload data files into a database using an extract, transform, and load process, or other batch process.

The present invention is also operable to identify shelf out-of-stock situations across RFID-tagged items and RFID-enabled stores according to specified criteria. The invention can provide a quantification of the value in terms of lost sales to a manufacturer both in terms of missed sales from out-of-stock conditions and from revisions to a sales forecast.

A low-level store and item-level view helps provide a compelling quantification of lost sales. To help analysts understand what kind of out-of-stock conditions are occurring at a micro-level for within a single store for a single item), three pieces of data are combined to get a view of what is happening. These data elements are (1) current on-hand inventory count for an item in a store. (2) sales volume in units for the store, and (3) movements of the items from the backroom to the sales floor to replenish a shelf which is supplied by RF ID events. The invention combines this information at a daily level and plots it over time. A corresponding chart identifies out-of-stock trends by identifying days where there were no sales because a shelf was empty at a selected store.

By plotting perpetual inventory with point-of-sale data and RFID movement data, potential out-of-stock conditions are identified. For example, a period showing no point-of-sale activity for a selected item but showing sufficient perpetual inventory indicates some probability that a shelf was empty given that the selected item sells regularly otherwise. Another factor considered is the last movement of a case of the selected item to the sales floor. Datasets considered over a larger time period can confirm out-of-stock probabilities.

The invention quantifies lost sales in dollars from shelf out-of-stock conditions. One mechanism for determining lost sales opportunity due to a shelf out-of-stock condition is to use a metric such as the daily sales forecast (store level) as an expected sales number where the total number of out-of-stock days can be multiplied by that value to see what sales would have occurred if the shelf was properly stocked. This mechanism works best for fast-moving items that regularly sell the same amount from week-to-week, as an out-of-stock situation means that the previously forecasted demand would have resulted in a known average amount of sales.

Higher-level analysis becomes important because many retailers maintain hundreds of RFID-enabled stores. The invention identifies stores with out-of-stock conditions and a number and type of out-of-stock conditions for flagging and sorting stores based on a specified priority. Data for stores with significant and measurable problems can then be accessed for further or detailed analysis.

There are a few general conditions that can be used on a higher level to provide insight into potential stores with out-of-stock conditions without doing an individual day/store/SKU analysis. One condition is point-of-sale "flatline." A point-of-sale flatline is an extended period where consecutive daily point-of-sale for the item is equal to zero. Occasionally a point-of-sale flatline is caused because an item was discontinued, or not desired by consumers, but the usual cause is an out-of-stock condition. Time periods of these occurrences and beginning and ending dates are identified. A simple point-of-sale flatline measurement is refined by comparing daily point-of-sale levels to a regular demand or to seasonal demands for a store.

Another general condition is items with no sales floor transition. Having no RFID reads indicating an item is moving from the backroom to the sales floor over an extended period is also an indicator that an item might be out-of-stock. Of course, it could also be due to a variety of other conditions including hardware failures or failing to load RFID data into a system. There are variations in demand by store which makes it difficult to use a threshold number of days to indicate an out-of-stock condition. Suppliers commonly tag case goods, with many individual items in a case resulting in fewer received sales floor transitions than point-of-sale transactions. In general, the time period for a suspected out-of-stock based on sales floor transition reads is longer than a point-of-sale flatline in most cases.

There are several data elements useful for receiving inventory data from retail stores. These data elements include a retailer's stock keeping unit or item number, UPC code for an item, item description, retail store number, date of on-hand inventory, a perpetual inventory count in retail units of the number of items in a store, order point for an item in retail units, and adjustments an on-hand, quantity based on changes at a store.

The present invention is operable to identify and generate various reports related to open shelf out-of-stock conditions.

One report identifies average on-hand items and sales by store and day of week. This report identifies the typical percentage of weekly sales for each day of the week. This report is useful for baseline or background historical information because a demand forecast provided from retailers and partners typically uses a weekly level forecast. To calculate a daily-level amount of lost sales it is important to know, on average, what would have sold on that day for a particular store and item.

Another report displays an early warning signal for zero-point-of-sale conditions. This report identifies which stores may potentially have an out-of-stock situation with a selected item based on the absence of point-of-sale transactions (i.e. point-of-sale flatline). To be useful as an early-warning signal the report is run on a daily basis when practical. This report is susceptible to problems and errors if data is not loaded consecutively for all days up to and including the latest date available. Sales floor movement data is factored in when calculating this report. A similar report identifies low point-of-sale conditions. An advanced version of this report considers a number of EPCs that moved to a sales floor on a last sales floor transition date.

Another report summarizes all reported on-hand adjustments as an indicator where phantom inventory may have been corrected by a retailer at a store. Typically, a store manager will be making these adjustments.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

The invention claimed is:

1. A method of detecting out-of-stock conditions for retail products via an RFID data collection system, the method comprising:

accessing RFID data associated with a product stocking event, wherein said RFID data includes electronic product codes corresponding to RFID-tagged retail products or product displays, and date and location data for the RFID-tagged retail products or product displays within a retail supply chain, wherein date and location data is obtained by at least one RFID reader to identify whether the RFID-tagged retail products or product displays are located on a retail store sales floor, and to identify whether the RFID-tagged retail products or product displays are located in a retail store backroom;

identifying out-of-stock conditions for the product stocking event based on RFID data; and updating a product stocking event plan;

wherein the product stocking event is a scheduled product stocking event;

wherein the RFID data is current RFID data and further includes information about movements of RFID-tagged retail products or product displays within the retail supply chain and within the retail store; and further comprising:

accessing historical RFID data associated with a completed product stocking event, wherein the historical RFID data includes information about movement of RFID tagged retail products within the retail supply chain and within the retail store, including information about movement of RFID-tagged retail products between the retail store backroom and the retail store floor;

accessing point-of-sale data associated with the completed product stocking event;

analyzing the historical RFID data and point-of-sale data;

creating a script for the scheduled product stocking event based on historical RFID data and point-of-sale data; and updating the script based on current RFID movement data and point-of sale data.

2. The method of claim 1, further comprising alerting for identified out-of-stock conditions.

3. The method of claim 1, further comprising dynamically updating sales forecasts based on identified out-of-stock conditions.

4. The method of claim 1, further comprising accessing perpetual inventory data associated with the product stocking event, wherein identifying out-of-stock conditions for the product stocking event is based on perpetual inventory data and RFID data.

5. The method of claim 1,
wherein the product stocking event is a promotional event;
wherein the product displays include a promotional display; and
further comprising dynamically updating scripts associated with the promotional event.

6. The method of claim 5, further comprising alerting for identified out-of-stock conditions.

7. The method of claim 5, further comprising dynamically updating sales forecasts based on identified out-of-stock conditions.

8. The method of claim 5, further comprising accessing point-of-sale data associated with the product stocking event, wherein identifying out-of-stock conditions for the product stocking event is based on point-of-sale data and RFID data.

9. The method of claim 5, further comprising accessing perpetual inventory data associated with the product stocking event, wherein identifying out-of-stock conditions for the product stocking event is based on perpetual inventory data and RFID data.

10. The method of claim 5, wherein the RFID data includes data from RFID-tagged individuals.

11. The method of claim 5, further comprising identifying noncompliant retail stores.

12. The method of claim 5, further comprising inferring product movement data for missed RFID reads.

13. The method of claim 1,
wherein the product stocking event is for turn stock products;
wherein the retail products are turn stock products; and
further comprising dynamically updating scripts associated with the turn stock products.

14. The method of claim 13, further comprising alerting for identified out-of-stock conditions.

15. The method of claim 13, further comprising dynamically updating sales forecasts based on identified out-of-stock conditions.

16. The method of claim 13, further comprising accessing point-of-sale data associated with the product stocking event, wherein identifying out-of stock conditions for the product stocking event is based on point-of-sale data and RFID data.

17. The method of claim 13, further comprising accessing perpetual inventory data associated with the product stocking event, wherein identifying out-of-stock conditions for the product stocking event is based on perpetual inventory data and RFID data.

18. The method of claim 13, further comprising accessing perpetual inventory data and point-of-sale associated with the product stocking event, wherein identifying out-of-stock conditions for the product stocking event is based on perpetual inventory data, point-of-sale data, and RFID data.

19. The method of claim 13, wherein the current RFID data includes data from RFID-tagged individuals.

20. The method of claim 13, further comprising identifying noncompliant retail stores.

21. The method of claim 1, further comprising accessing current point-of-sale data associated with RFID-tagged product movement data.

22. The method of claim 1, further comprising accessing perpetual inventory data associated with the product stocking event, wherein creating the script is also based on accessed perpetual inventory data.

23. The method of claim 1, further comprising maintaining adjustable threshold numbers for identifying out-of-stock conditions.

* * * * *

UNITED STATES PATENT AND TRADEMARK OFFICE
CERTIFICATE OF CORRECTION

| | |
|---|---|
| PATENT NO. | : 8,321,303 B1 |
| APPLICATION NO. | : 11/695511 |
| DATED | : November 27, 2012 |
| INVENTOR(S) | : Krishnamurthy et al. |

It is certified that error appears in the above-identified patent and that said Letters Patent is hereby corrected as shown below:

In the Specification, col. 3, line 56, the phrase "from an RF ID data collection" should read "from an RFID data collection".

In the Specification, col. 3, lines 64-65, the phrase "products may used RF ID readers" should read "products may use RFID readers".

In the Specification, col. 4, line 28, the phrase "RF ID data includes" should read "RFID data includes".

In the Specification, col. 4, line 32, the phrase "codes. RF ID" should read "codes. RFID".

In the Specification, col. 4, line 58, the phrase "RF ID data and product" should read "RFID data and product".

In the Specification, col. 5, line 13, the phrase "prod stocking event" should read "product stocking event".

In the Specification, col. 5, line 13, the phrase "plan, a pianogram" should read "plan, a planogram".

In the Specification, col. 6, line 48, the phrase "is diagram of" should read "is a diagram of".

In the Specification, col. 6, line 53, the phrase "is a flow ha" should read "is a flow chart".

In the Specification, col. 6, line 56, the phrase "for selfout-of-stock" should read "for self out-of-stock".

In the Specification, col. 8, line 14, the phrase "manufacturers sales" should read "manufacturers' sales".

In the Specification, col. 9, line 28, the phrase "For stationary RF ID readers" should read "For stationary RFID readers".

In the Specification, col. 12, lines 20-21, the phrase "Another category. "Not In Store."" should read "Another category, "Not in Store,"".

In the Specification, col. 12, line 40, the phrase "date is Apr. 27" should read "date of Apr. 27".

In the Specification, col. 12, line 44, the phrase "Last F Entry Time" should read "Last SF Entry Time".

In the Specification, col. 13, line 24, the phrase "RFC supply chain" should read "RFID supply chain".

In the Specification, col. 13, line 30, the phrase "of RF ID tags" should read "of RFID tags".

Signed and Sealed this
First Day of October, 2013

Teresa Stanek Rea
*Deputy Director of the United States Patent and Trademark Office*

CERTIFICATE OF CORRECTION (continued)
U.S. Pat. No. 8,321,303 B1

In the Specification, col. 13, line 35, the phrase "a box crusher RF ID" should read "a box crusher RFID".

In the Specification, col. 14, line 29, the phrase "RFD data comes" should read "RFID data comes".

In the Specification, col. 16, line 66, the phrase "enable some RFD" should read "enable some RFID".

In the Specification, col. 17, line 20, the phrase "had sold out of a products" should read "have sold out of a product".

In the Specification, col. 17, line 64, the phrase "item name. UPC" should read "item name, UPC".

In the Specification, col. 18, line 45, the phrase "the max(last sales" should read "the max (last sales".

In the Specification, col. 20, line 12, the phrase "50.1-144%" should read "50.1-100%".

In the Specification, col. 20, line 16, the phrase "for Store #123, Store" should read "for Store #123. Store".

In the Specification, col. 23, line 5, the phrase "in a store. (2)" should read "in a store, (2)".

In the Specification, col. 23, line 7, the phrase "supplied by RF ID" should read "supplied by RFID".

In the Specification, col. 24, line 5, the phrase "adjustments an on-hand, quantity" should read "adjustments for on-hand quantity".

In the Claims, col. 25, line 17, claim 1, the phrase "and point-of sale" should read "and point-of-sale".

In the Claims, col. 26, line 20, claim 3, the phrase "identifying out-of stock" should read "identifying out-of-stock".